(12) United States Patent
Antony et al.

(10) Patent No.: US 10,228,983 B2
(45) Date of Patent: Mar. 12, 2019

(54) RESOURCE MANAGEMENT FOR CONTAINERS IN A VIRTUALIZED ENVIRONMENT

(71) Applicant: VMWARE, INC., Palo Alto, CA (US)

(72) Inventors: Jinto Antony, Bangalore (IN); Hariharan Jeyaraman Ganesan, Bangalore (IN); Madhusudhanan Gangadharan, Bangalore (IN); Rajasekar Shanmugam, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/919,088

(22) Filed: Mar. 12, 2018

(65) Prior Publication Data
US 2018/0203742 A1   Jul. 19, 2018

Related U.S. Application Data

(63) Continuation of application No. 14/840,051, filed on Aug. 31, 2015, now Pat. No. 9,921,885.

(30) Foreign Application Priority Data

Jun. 19, 2015   (IN) .......................... 3078/CHE/2015

(51) Int. Cl.
*G06F 9/455*   (2018.01)
*G06F 9/50*   (2006.01)

(52) U.S. Cl.
CPC ........ *G06F 9/5077* (2013.01); *G06F 9/45558* (2013.01); *G06F 9/505* (2013.01); *G06F 2009/45562* (2013.01); *G06F 2009/45575* (2013.01); *Y02D 10/22* (2018.01); *Y02D 10/36* (2018.01)

(58) Field of Classification Search
CPC .................................................... G06F 9/5077
USPC ............................................................ 718/1
See application file for complete search history.

(56) References Cited

U.S. PATENT DOCUMENTS

| | | |
|---|---|---|
| 2009/0265707 A1 | 10/2009 | Goodman et al. |
| 2012/0198442 A1 | 8/2012 | Kashyap et al. |
| 2012/0254861 A1* | 10/2012 | Down, Jr. ................ G06F 8/63 718/1 |
| 2013/0198319 A1 | 8/2013 | Shen et al. |
| 2015/0033072 A1 | 1/2015 | Barr et al. |

* cited by examiner

*Primary Examiner* — Timothy A Mudrick
(74) *Attorney, Agent, or Firm* — Loza & Loza, LLP

(57) ABSTRACT

A virtualized environment includes a pool of VMs, each VM configured to run one or more virtual containers. Each virtual container runs as an isolated process in userspace on a guest operating system. A virtualization management module performs resource management operations to place containers within the pool of VMs according to performance metrics, and also perform high availability functionality for containers with critical containers.

20 Claims, 5 Drawing Sheets

RESOURCE MANAGEMENT FOR CONTAINERS IN A VIRTUALIZED ENVIRONMENT

CROSS-REFERENCE TO RELATED APPLICATIONS

This application claims priority from and is a continuation of U.S. patent application Ser. No. 14/840,051, filed Aug. 31, 2015 (now U.S. Pat. No. 9,921,885), which claims priority from Foreign Application Serial No. 3078/CHE/2015, filed Jun. 19, 2015 in India, which are both incorporated herein by reference in their entirety.

BACKGROUND

Recently, the use of application containers has become an increasingly popular way of executing applications on a host computer. A container provides for the isolation of a group of processes from the others on an operating system. By making use of existing operating system functionality (such as Linux name spaces), containers maintain their own private view of the operating system, file system structure, and network interfaces. Containers share the operating system kernel with other processes, but can be constrained to some extent to use an amount of resources such as the central processing unit (CPU), random access memory (RAM), or input/output (I/O) devices. Containers have proven advantageous because they typically have a small system "footprint." That is, containers provide a relatively thin encapsulation layer above and beyond any applications contained therein. Thus, instantiation and deployment of containers is relatively quick.

Virtual machines, on the other hand, tend to deploy more slowly than containers. This is due to the fact that virtual machines are a software abstraction of a physical computer. Thus, a virtual machine typically includes a guest operating system and a virtual hardware platform. These virtualized system components are not present in containers. However, virtual machines are advantageous because a higher degree of isolation and security may be achieved between virtual machines as opposed to the degree of isolation that may be achieved between containers. As such, there are drawbacks to using container-based and operating-system-level virtualization.

SUMMARY

One or more embodiments disclosed herein provide a method for managing virtual containers in a virtualized environment. The method includes instantiating a pool of virtual machines (VMs). Each virtual machine comprises a guest operating system and a container daemon configured to provide operating-system-level virtualization with the guest operating system. The method further includes receiving performance metrics of the pool of VMs, and responsive to a request to start a new virtual container comprising an application, selecting a VM from the pool of VMs based on the received performance metrics. The method includes starting the new virtual container in the selected VM, wherein the instance of the virtual container comprises an isolated process in userspace executing in the guest operating system.

Further embodiments of the present disclosure include a non-transitory computer-readable storage medium that includes instructions that enable a processing unit to implement one or more of the methods set forth above or the functions of the computer system set forth above.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

DETAILED DESCRIPTION

Figure 1:
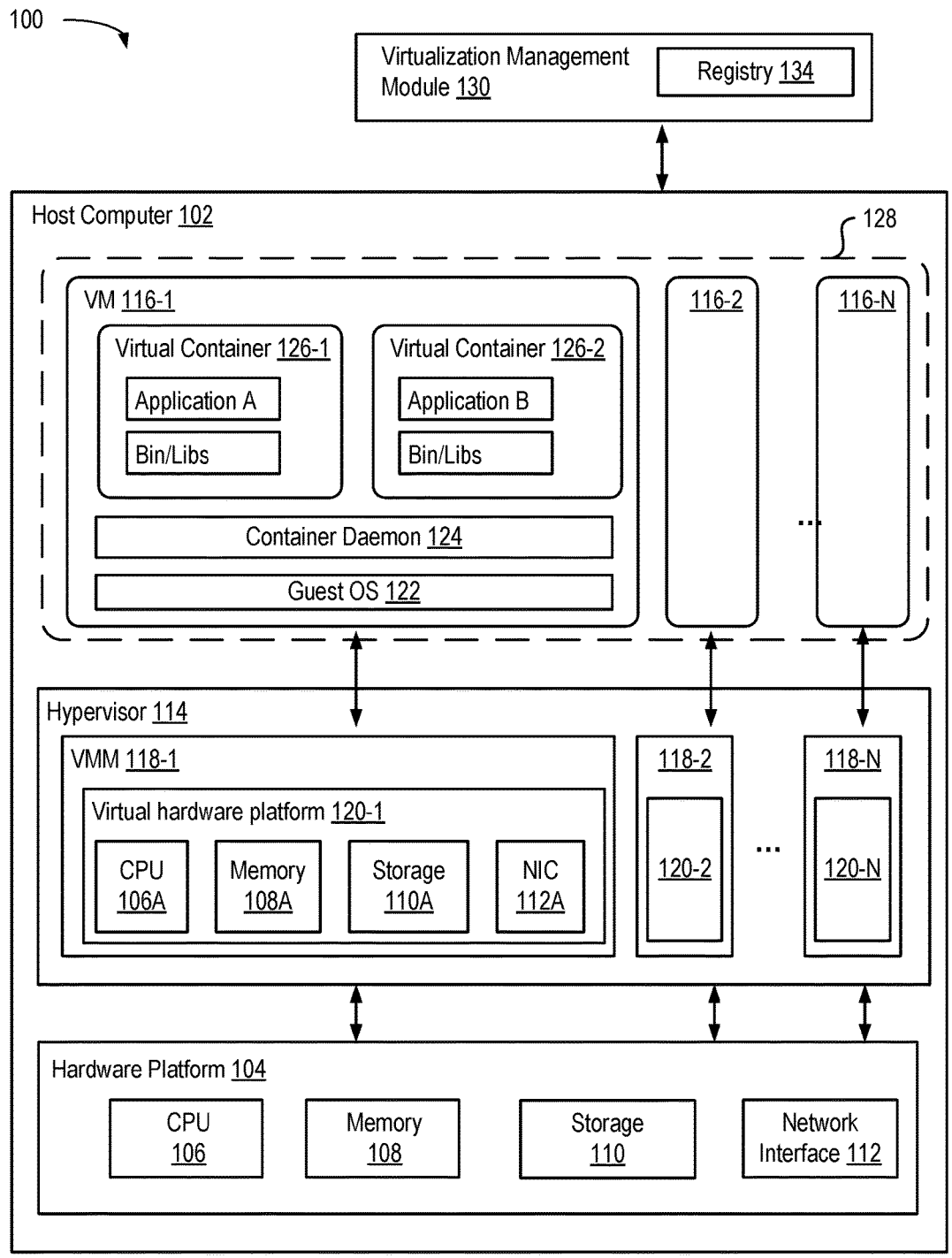
FIG. 1 is a block diagram that illustrates a computing system with which one or more embodiments of the present disclosure may be utilized.

FIG. 1 is a block diagram that illustrates a computing system 100 with which one or more embodiments of the present disclosure may be utilized. As illustrated, computing system 100 includes at least one host computer 102. Although a single host is depicted in FIG. 1, it is recognized that computing system 100 may include a plurality of host computers 102, which can be arranged in an interconnected server system such as a data center.

Host 102 is configured to provide a virtualization layer that abstracts computing resources of a hardware platform 104 into multiple virtual machines (VMs) 116 that run concurrently on the same host 102. Hardware platform 104 of host 102 includes CPU 106, memory 108, storage 110, networking interface 112, and other conventional components of a computing device. VMs 116 run on top of a software interface layer, referred to herein as a hypervisor 114, that enables sharing of the hardware resources of host 102 by the virtual machines. One example of hypervisor 114 that may be used in an embodiment described herein is a VMware ESXi™ hypervisor provided as part of the VMware vSphere® solution made commercially available from VMware, Inc of Palo Alto, Calif. Hypervisor 114 provides a device driver layer configured to map physical resource of hardware platforms 104 to "virtual" resources of each VM 116 such that each VM 116-1 to 116-N has its own corresponding virtual hardware platform (e.g., a corresponding one of virtual hardware platforms 120-1 to 120-N). Each such virtual hardware platform 120 provides emulated hardware (e.g., memory 108A, processor 106A, storage 110A, network interface 112A, etc.) that may, for example, function as an equivalent, conventional hardware architecture for its corresponding VM 116. Virtual hardware platforms 120-1 to 120-N may be considered part of virtual machine monitors (VMMs) 118-1 to 118-N which implement virtual system support to coordinate operations between hypervisor 114 and corresponding VMs 116-1 to 116-N.

Hypervisor 114 may run on top of a host operating system of host 102 or directly on hardware components of host 102. Each VM 116 includes a guest operating system 122 (e.g., Microsoft Windows®, Linux™) and one or more guest applications and processes running on top of guest operating system 122.

In one or more embodiments, each VM 116 includes a container daemon 124 installed therein and running as a guest application under control of guest OS 122. Container daemon 124 is a process that enables the deployment and management of virtual instances (referred to interchangeably herein as "containers" or "virtual containers") by providing a layer of operating-system-level virtualization on guest OS 122 within VM 116. Containers are software instances that enable virtualization at the operating system level. That is, with containerization, the kernel of an operating system that manages a host computer is configured to provide multiple isolated user space instances. These instances, referred to as containers, appear as unique servers from the standpoint of an end user that communicates with the containers. However, from the standpoint of the operating system that manages the host computer on which the containers execute, the containers are user processes that are scheduled and dispatched by the operating system. Examples of a container daemon include the open-source Docker platform made available by Docker, Inc. and Linux Containers (LXC).

Typical approaches to virtualization only use operating-system-level virtualization to the exclusive of other virtualization techniques, such as virtual machines. That is, a container daemon typically executes on top of a host operating system on a physical host, thereby avoiding the overhead of operating a virtual machine and its guest operating system. However, by running a container in a physical system, unused resources in the server can be wasted, since many containers are used temporarily and only partially the total system resources available in the server.

Accordingly, embodiments of the present disclosure include a container daemon 124 running on top of a guest operating system 122 within a virtual machine 116. In doing so, embodiments of the present disclosure may intelligently provide resource scheduling for containers based on system requirements and ongoing system performance. In one or more embodiments, container daemon 124 is configured to utilize resource isolation features of guest OS 122 to permit multiple virtual containers 126 (e.g., containers 126-1 and 126-2) to run within a single virtual machine. For example, in cases where guest OS 122 includes a Linux™ kernel, container daemon 124 may use features such as kernel namespaces to isolate a container's view of guest OS 122, including process and user IDs, process trees, and mounted file systems, and the Control Groups (or "cgroups") feature to isolate virtual CPU 106A, virtual RAM 108A, storage 110A, and networking (112A) resources. In some embodiments, container daemon 124 executes system calls and requests operating system services and VM resources from guest OS 122. Guest OS 122 allocates virtual resources to container daemon 124, which correspond to physical computing resources (such as physical memory in RAM 108). The physical resources are allocated by hypervisor 114 that manages the execution of VM 116, as well as all other virtual machines executing within the particular host computer on which VM 116 runs.

In one embodiment, each VM 116 is configured to run one or more virtual containers 126 therein. A virtual container 126 may be instantiated on a VM by container daemon 124. Each virtual container (e.g., 126-1) runs as an isolated process in userspace on guest OS 122, sharing the kernel of guest OS 122 with other virtual containers (e.g., 126-2). Each virtual container 126 may be a package (sometimes referred to as an "image") of pre-installed application code and any binaries and libraries used for the execution of that application code to create a virtualized application. In some cases, virtual container 126 may be a blank image into which applications may be installed or launched within. As depicted in FIG. 1, VM 116-1 includes a first virtual container 126-1 having application code for Application A and its associated binaries and libraries, and a second virtual container 126-2 having application code for Application B and its associated binaries and libraries. According to one or more embodiments, container daemon 124 communicates with local (or remote) processes according to a client/server model. For example, a client process (e.g., a system administration process) may transmit a request to container daemon 124 to deploy a new container or to update an already existing container, for example, by installing a new application within the container. Further, another client process may transmit a request to container daemon 124 to quiesce or destroy a container.

Computing system 100 includes virtualization management module 130 that may communicate with the one or more hosts 102. Virtualization management module 130 is configured to carry out administrative tasks for the computing system 100, including managing hosts 102, managing VMs running within each host 102, provisioning VMs, migrating VMs from one host to another host, and load balancing between hosts 102. In one embodiment, virtualization management module 130 is a computer program that resides and executes in a central server, which may reside in computing system 100, or alternatively, running as a VM in one of hosts 102. One example of virtualization management module 130 is the vCenter Server® product made available from VMware, Inc.

Resource Management of Containers

In one or more embodiments, virtualization management module 130 is configured to perform resource management for virtual containers 126 in a virtualized environment. Virtualization management module 130 may create a virtual infrastructure by instantiating a packaged group (or pool 128) of a plurality of VMs 116 having container daemons 124 installed therein. Virtualization management module 130 is configured to interact with container daemons 124 installed on each of the VMs to deploy, update, or remove instances of containers on each of the VMs. Virtualization management module 130 is configured to maintain a registry 134 that tracks location, status, and other metadata of each virtual container instance executing in the plurality of VMs 116.

Virtualization management module 130 is configured to manage virtualized resources such that at any given time a specified quantity of free CPU and memory resources are available within the pool of VMs. When a user requests for a container 126, the requested container will be placed on any VM within the designated pool of VMs with enough resources (e.g., CPU, memory) based on the container request specified by the user. Virtualization management module 130 may intelligently allocate available resources across the pool of VMs to make an initial placement of the container within the pool of VMs. Whenever the available resources within the pool of VMs drops below a predefined free memory or CPU limit, then virtualization management module 130 powers on additional VMs within the pool of VMs. When containers are stopped and the resource requirements within the pool of VMs goes beyond the predefined free memory or CPU limits, virtualization management module 130 powers off one or more VMs within the pool of VMs, thus saving resources. Virtualization management module 130 may be configured to identify the current CPU and memory available on each VM in the pool of VMs to identify a VM for initial placement of the container. After initial placement is done for the containers, and if all the resources available in the pool of VMs have been use, then virtualization management module 130 may start to dynamically allocate additional memory and CPU resources (sometimes referred to as "hot-adding") for each VM as per the resource requirement. Whenever there is a CPU or memory resource shortage on any particular VM in the pool of VMs, then memory or CPU can be hot-added to resolve the resource constraints.

Figure 2:
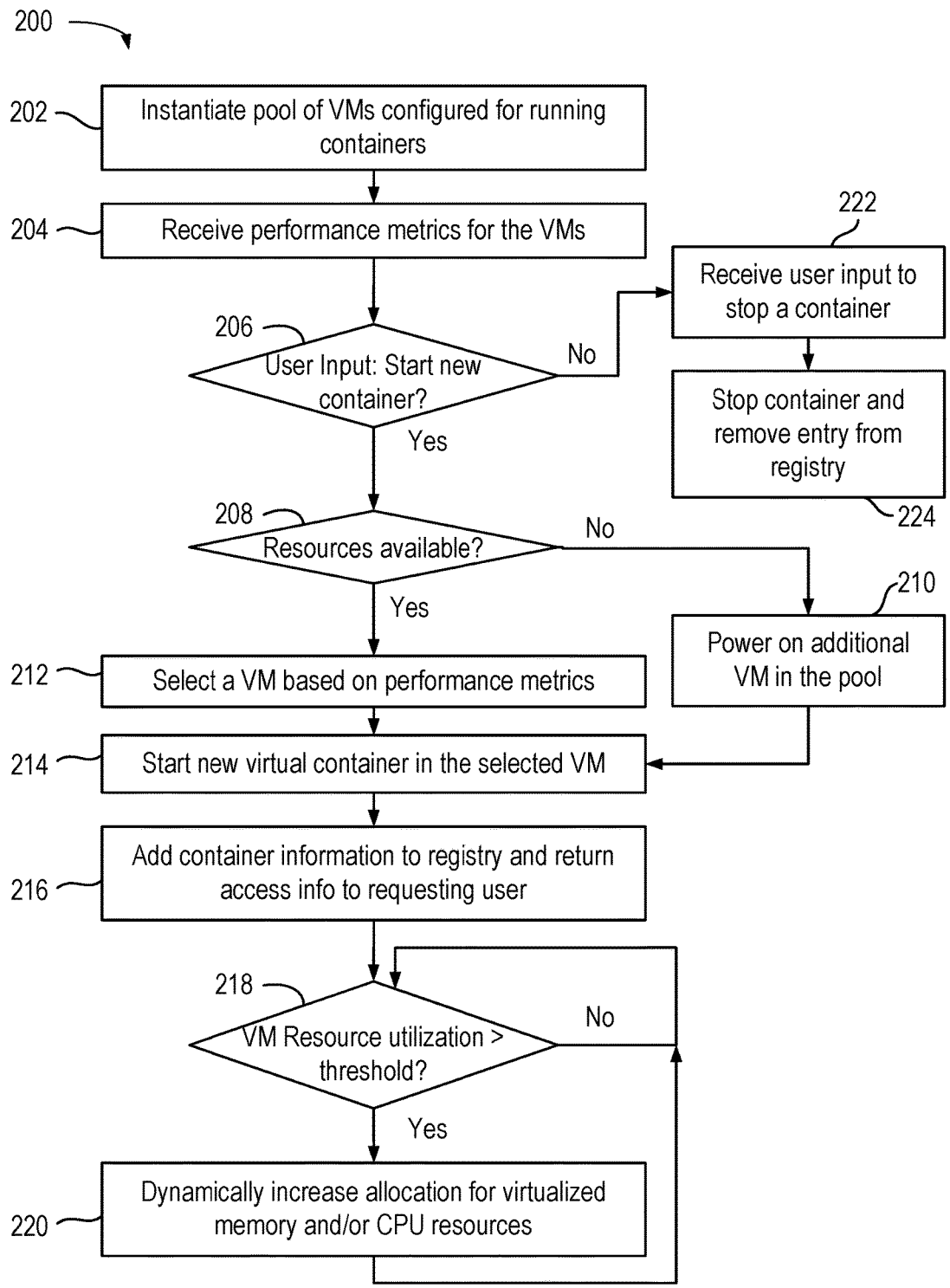
FIG. 2 is a flow diagram that illustrates steps for a method for managing containerized applications in a virtual environment, according to an embodiment of the present disclosure.
Figure 3A:
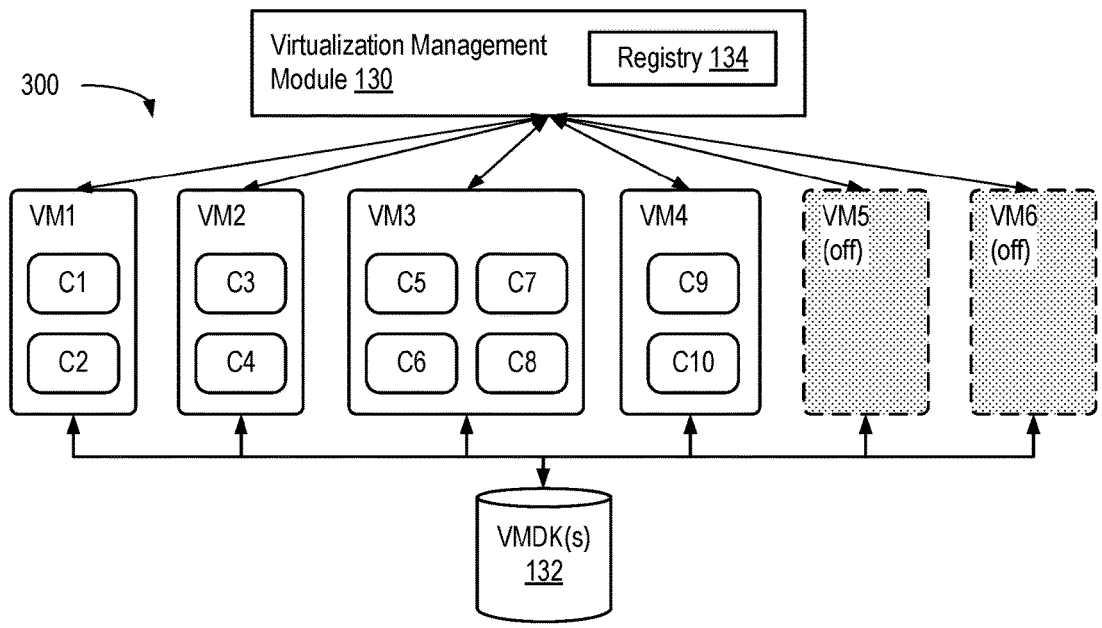
FIGS. 3A and 3B depict resource management operations of virtualization management module, according to an embodiment.

FIG. 2 is a flow diagram that illustrates steps for a method 200 for managing containerized applications in a virtual environment, according to an embodiment of the present disclosure. FIG. 2 is described in conjunction with FIGS. 3A and 3B which depict resource management operations of virtualization management module 130. It should be recognized that, even though the method 200 is described in conjunction with the system of FIG. 1 and of FIGS. 3A and 3B, any system configured to perform the method steps is within the scope of embodiments of the disclosure.

The method 200 begins at block 202, where virtualization management module 130 instantiates a pool of VMs 128 configured for running containers. Pool 128 of VMs may have (user-) specified resource controls that represent an aggregate amount of resources (e.g., CPU, memory) allocated to the entire pool 128 for use among the various VMs 116 within the pool. Pool 128 of VMs may further have a specified (minimum) amount of free CPU and memory resources that virtualization management module 130 maintains as being available within pool of VMs 128. Each VM 116 in pool 128 includes an instance of a guest operating system 122 and a container daemon 124 configured to provide operating-system-level virtualization with the corresponding instance of guest operating system 122. In one embodiment, a first subset of the plurality of VMs is initially powered on and a second subset (i.e., the remainder) of the plurality of VMs is initially powered off. For example, out of N VMs that are instantiated, one or two VMs may be powered on initially to avoid wasting resources by having all VMs running but idle. As used herein, In the embodiment shown in FIG. 3A, virtualization management module 130 has instantiated a pool 300 of VMs identified as VM1 to VM6 for running containers 126. As shown, VM1, VM2, VM3, and VM4 are powered on and are already running containers identified as C1 to C10, and VM5 and VM6 are depicted as being powered off. Hosts 102 and hardware resources of hosts 102 have been omitted for clarity of illustration. Further, though not shown, it should be recognized that the pool of VMs may running on hosts 102 that are simultaneously running other VMs and other workloads that are unrelated to containers 126.

Referring back to FIG. 2, at block 204, virtualization management module 130 receives performance metrics of the plurality of container-supported VMs. In one embodiment, virtualization management module 130 is configured to communicate with hosts 102 and/or hypervisors 114 in the hosts to collect raw performance data and generate performance metrics (e.g., counters, statistics) related to availability, status, and performance of hosts 102 and VMs 116. The performance metrics may include VM configurations and resource control settings about VMs 116, e.g., CPU and memory allocations, as well as metrics related to host-level and guest-level memory, CPU, network, and storage resource utilization. The performance metrics may be received periodically according to a pre-determined periodicity (e.g., every 5 minutes), or in response to an active polling from virtualization management module 130.

At block 206, virtualization management module 130 may receive user input from a system administrator. In some cases, the user input may be a request to start a new virtual container having a specified application executing therein. In other cases, the user input may be a request to shut down or stop an already running container. Where the request is to start a new container, the user input may indicate a specific pre-defined image of a virtual container and/or a specific application to be executed within the virtual container. In some embodiments, a user may have selected the image of the virtual container and the application from a pre-defined inventory of containerized applications. In some embodiments, the user input may include a specific amount of computing resources (e.g., CPU, memory) for running the container. For example, the user input requests the start of a new container having 2 GB of RAM and at least 1 GHz CPU resources.

At block 208, responsive to a request to start a new virtual container comprising an application, virtualization management module 130 determines whether adequate resources are available within pool of VMs 128 for executing the new virtual container based on the received performance metrics. As described earlier, virtualization management module 130 keeps track of resources utilized by all VMs in pool 128 using performance metrics (received in block 204). In one implementation, virtualization management module 130 may calculate the amount of available resources within pool of VMs 128 as the difference between the aggregate resource allocation specified for pool of VMs 128 and the aggregate amount of resources consumed by all VMs 116 within pool 128. In some embodiments, the sufficiency of available resources may be determined according to a comparison of the amount of available resources in pool of VMs 128 (in aggregate or on a per-VM basis) and the amount of resources requested by the user for running the new container. In other embodiments, the sufficiency of available resources may be determined according to a default minimum amount of available resources that must be maintained (i.e., each VM or overall pool of VMs 128 must still have some specified amount of memory and CPU resources available after creation of the new container).

At block 210, responsive to determining that the pool of VMs has inadequate resources for executing the new virtual container based on the received performance metrics, virtualization management module 130 reacts by powering on an additional VM as part of pool of VMs 128. In one embodiment, virtualization management module 130 powers one or more of the VMs 116 that had been powered off initially. Operations may then proceed to block 214, in which virtualization management module 130 starts a new instance of the virtual container in the newly powered-on VM. In some embodiments, the instance of the virtual container is an isolated process in userspace executing in the guest operating system.

Figure 3B:
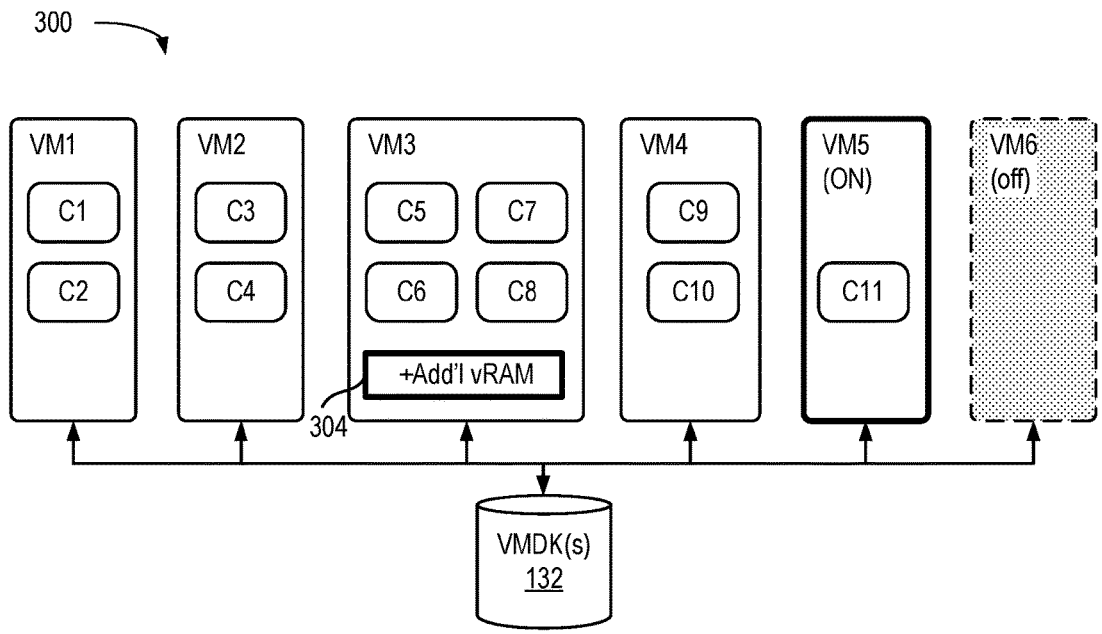

For example, in the embodiment shown in FIG. 3B, virtualization management module 130 has determined that the virtual machines VM1 to VM4 within pool 300 do not have sufficient available resources to handle a new virtual container C11 requested by the user. Accordingly, as depicted in FIG. 3B, virtualization management module 130 powers on VM5, and transmits a request to container daemon 124 within VM5 to start an instance of container C11. It should be noted that virtualization management module 130 may perform the converse operation and power off VMs as well. When the resource requirements within the virtualized environment or pool 128 decreases and/or a VM is not serving any containers, virtualization management module 130 may power off an idle VM, thereby saving power and underlying physical resources used to run the idle VM.

Referring back to FIG. 2, at block 212, responsive to determining that the pool of VMs has adequate resources for executing the new virtual container based on the received performance metrics, virtualization management module 130 selects one of the VMs from the plurality of VMs (i.e., pool 128) for an initial placement of the virtual container based on the received performance metrics. In some embodiments, virtualization management module 130 may select a VM from pool 128 that has more available resources than other VMs in the pool, or according to other load balancing techniques known to those skilled in the art. As such, virtualization management module 130 may intelligently allocate available resources across pool of VMs 128 to make an initial placement of the container within the pool of VMs.

At block 214, virtualization management module 130 starting the new virtual container in the selected VM. In one implementation, virtualization management module 130 transmits a request to container daemon 124 within the selected VM to start a new instance of a virtual container having the image, application, and allocated resources as requested by the user. In some embodiments, the instance of the virtual container comprises an isolated process in user-space executing in the guest operating system.

At block 216, virtualization management module 130 adds container information to registry 134 and returns access information (e.g., IP address) to the requesting user. In some embodiments, registry 134 is updated to add information regarding the selected VM on which the container instance has been placed (e.g., "vmid=VM5"), a unique identifier of the container instance (e.g., "cid=C11"), and address information on how the virtual contained can be accessed (e.g., IP address). In some implementations, the metadata associated with the virtual container may be returned from container daemon 124 which started the virtual container in the selected VM.

Virtualization management module 130 then periodically monitors performance and resource utilization of all VMs within pool 128. At block 218, virtualization management module 130 determines whether resource utilization of pool of VMs 128 has reached a threshold limit according to the received performance metrics of the VMs. In some implementations, the threshold limit may be represented as an absolute value of resources (e.g., GHz, MB), or as a percentage. If so determined, at block 220, virtualization management module 130 may dynamically increase the allocation of virtualized memory or computing resources to one or more VMs in pool 128. In some embodiments, virtualization management module 130 may dynamically increase the virtualized memory and/or computing resources allocated to an individual VM within pool 128 having particular resource constraints, or a plurality of VMs within pool 128 according to aggregate resource contention.

For example, in the embodiment shown in FIG. 3B, virtualization management module 130 has determined at least one VM within pool 300 have resource utilization greater than the predetermined limit of 80%, specifically VM3 (that is running containers C5 to C8). Accordingly, as depicted in FIG. 3B, virtualization management module 130 dynamically increases the allocation of virtualized memory (VRAM) for VM5 with additional virtualization memory 304. In other examples, virtualization management module 130 might dynamically increase the allocation of CPU resources (e.g., vCPU) for a VM.

Referring back to FIG. 2, at block 222, virtualization management module 130 may receive user input, from a system administrator, that requests one or more containers running within pool 128 be stopped. If so, at block 224, virtualization management module 130 stops the specified container(s) and removes entries from registry 134 associated with the stopped containers. In some embodiments, virtualization management module 130 transmits a stop request to each container daemon 124 on which the specified containers execute, and directs the container daemons 124 to shut down operation of the one or more containers.

High Availability for Containers

In one or more embodiments, virtualization management module 130 is configured to provide high availability functionality for virtual containers 126 in a virtualized environment. Virtualization management module 130 may instantiate a pool 128 of VMs having container daemons 124 installed therein and having high availability functionality enabled. In one embodiment, virtualization management module 130 enables fault tolerance functionality for a subset of the pool of VMs, e.g., 30% of the VMs. When a user requests to launch a containerized application that has been designated as highly critical (i.e., cannot afford any downtime), virtualization management module 130 initially places the container in a VM having fault tolerance functionality enabled (and also having sufficient resources, as described earlier).

As described earlier, virtualization management module 130 maintains a registry 134 of all running containers within pool 128 of VMs. Virtualization management module 130 monitors all the containers running within pool 128 of VMs from their start until the containers are stopped gracefully. In the case that a container 126 running in a VM 116 is found to be stopped unexpectedly but the VM is running fine, then virtualization management module will restart the container (only) using the same container identifier with help of container daemon 124 such that the end user can continue to access the container with the same state of the container maintained even after the restart. In the case that one of the VMs within pool 128 has crashed, then virtualization management module 130 restarts all the containers once the crashed VM has been restarted within a predefined duration and using a same container identifier. This helps in persisting the state of the container even though there may have been some downtime while getting the container back up and running for the end user's access. In the case that the crashed VM within pool 128 does not restart within the predefined duration, then virtualization management module 130 may restart the same containers or application in a different VM 116 with the same user access information (e.g., IP address). As such, even though there was some downtime for the application encapsulated by the container, the user may still be able to re-access the application quickly (even though there might be a loss of state of the application).

Figure 4:
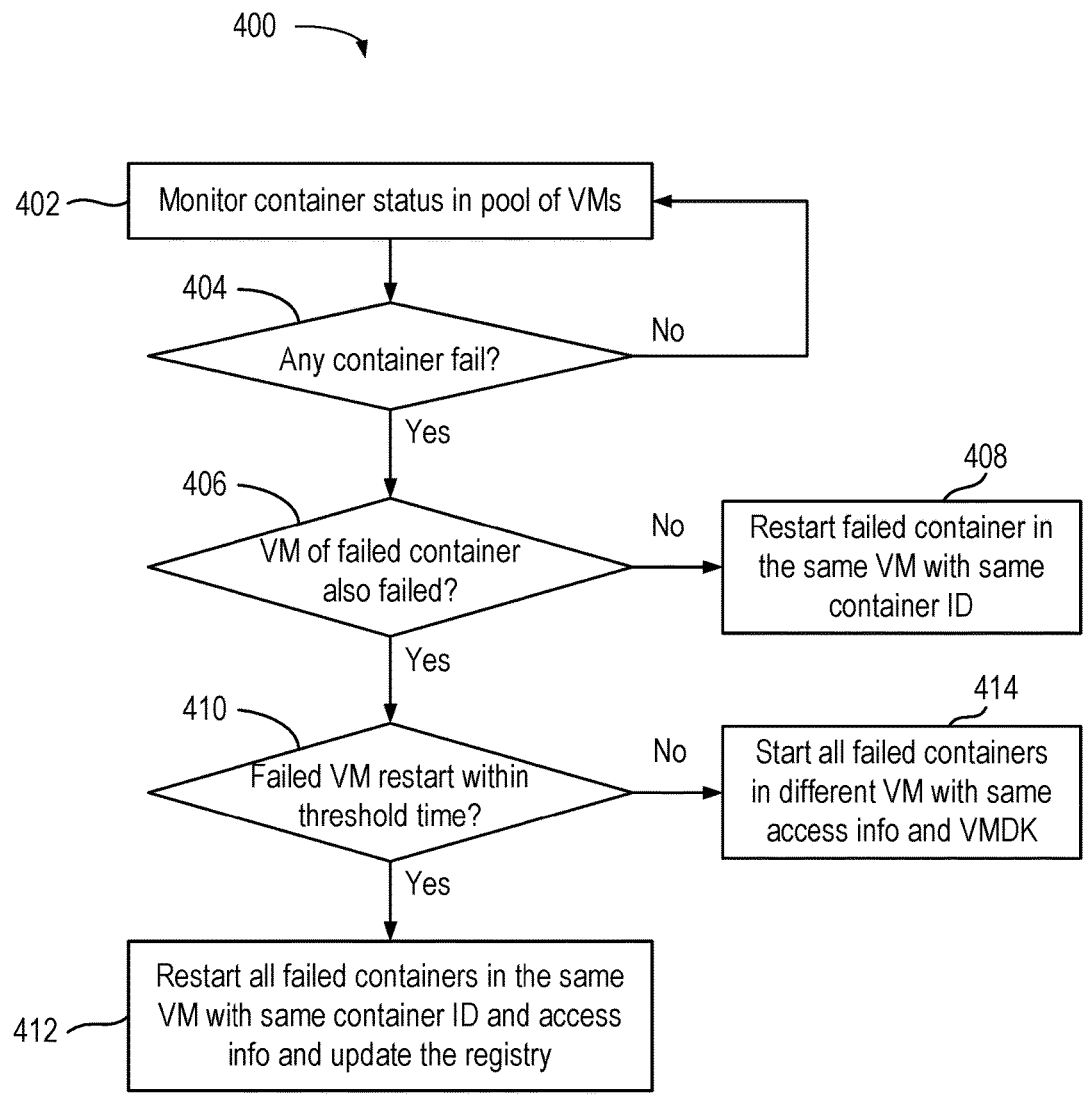
FIG. 4 is a flow diagram that illustrates steps for a method for managing containerized applications in a virtual environment, according to an embodiment of the present disclosure.

FIG. 4 is a flow diagram that illustrates steps for a method 400 for managing containerized applications in a virtual environment, according to an embodiment of the present disclosure. FIG. 4 is described in conjunction with FIGS. 5A and 5B which depict high availability mode of operations of virtualization management module 130. It should be recognized that, even though the method 400 is described in conjunction with the system of FIG. 4 and of FIGS. 5A and 5B, any system configured to perform the method steps is within the scope of embodiments of the disclosure.

The method 400 begins at block 402, where virtualization management module 130 monitors status of all containers executing on VMs within pool of VMs 128. In some embodiments, virtualization management module 130 may query each container daemon 124 running in each VM 116 in pool 128 to determine the status of containers known to be running in that VM 116, as per information from registry 134. Each container daemon 124 may respond with status information indicating the start/stop status, runtime, and identifiers. In one embodiment, virtualization management module 130 iterates through registry 134 and checks on each container known to be running in pool 128. Entries within registry 134 may be updated according to the retrieved status information. In other embodiments, virtualization management module 130 may utilize a heartbeat mechanism with each container daemon 124 that periodically confirms the status of the containers.

At block 404, virtualization management module 130 determines whether any of the running containers have failed, or stopped unexpectedly. If so, at block 406, responsive to determining that the virtual container has failed, virtualization management module 130 further determines whether the VM on which the failed virtual container was running has also failed. In some embodiments, virtualization management module 130 may conclude that both the container and the VM on which the container was running have failed based on a failed or unresponsive status from the VM itself.

Figure 5A:
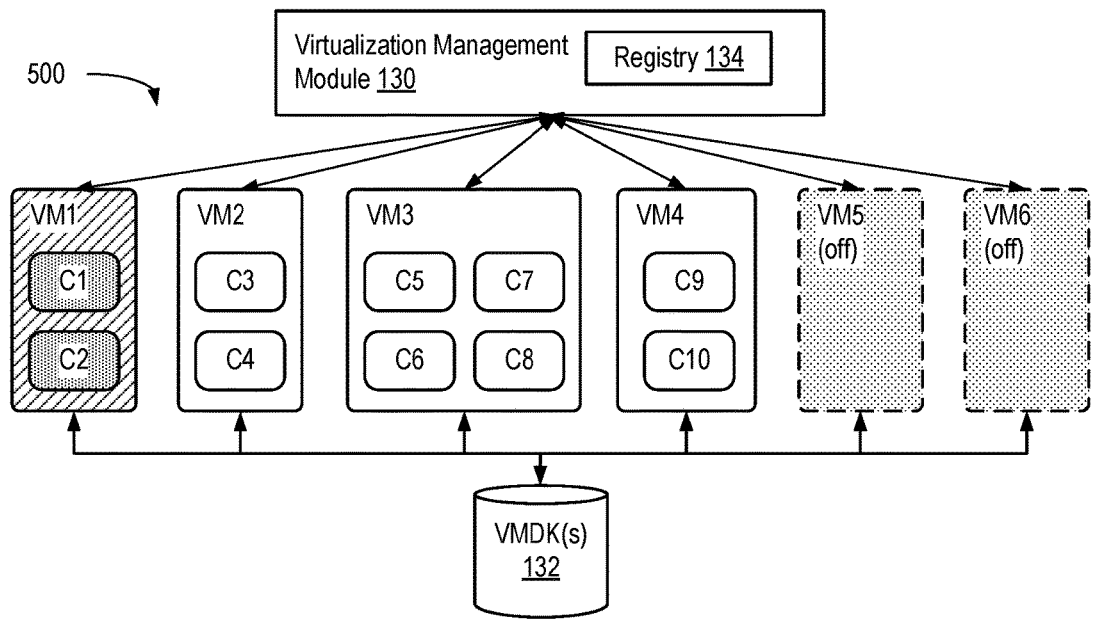
FIGS. 5A and 5B depict failover and high availability operations of virtualization management module, according to an embodiment.
Figure 5B:
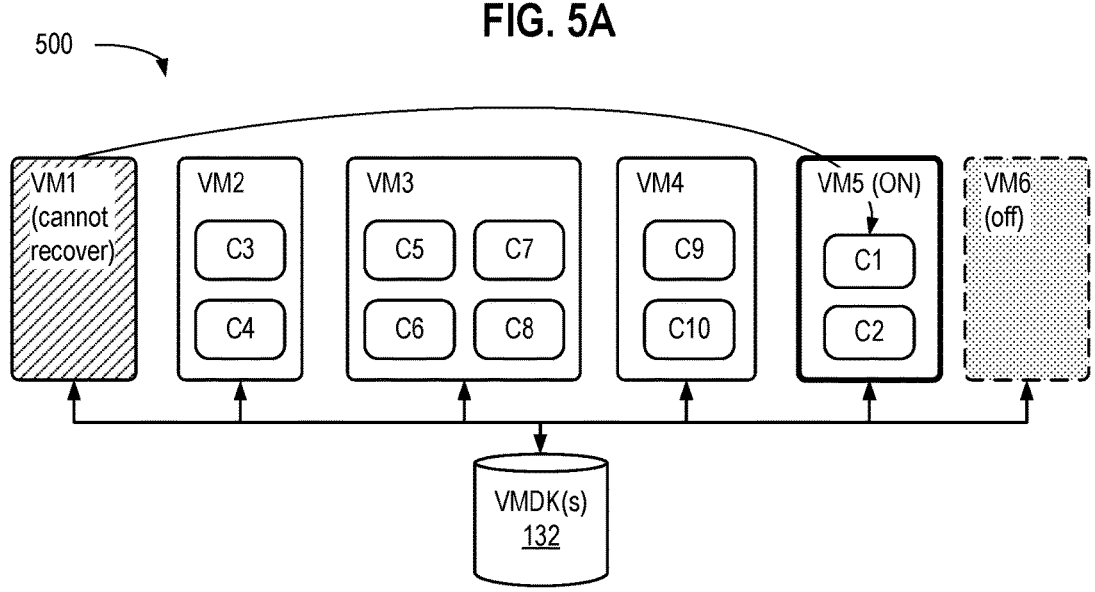

For example, in the embodiment shown in FIG. 5A, virtualization management module 130 has instantiated a pool 500 of VMs identified as VM1 to VM6 for running containers 126. As shown, VM1, VM2, VM3, and VM4 are powered on and are already running containers identified as C1 to C10, and VM5 and VM6 are depicted as being powered off. The plurality of VMs (VM1 to VM6) share a common virtual disk 132, sometimes referred to as a VMDK, having a common disk image containing a pre-installed guest operating system and container daemon for running containers. As with FIG. 3A, hosts 102 and hardware resources of hosts 102 have been omitted for clarity of illustration. Further, though not shown, it should be recognized that the pool of VMs may running on hosts 102 that are simultaneously running other VMs and other workloads that are unrelated to containers 126. As depicted, VM1 that was running containers C1 and C2 has failed.

Referring back to FIG. 4, at block 408, responsive to determining that the virtual container has failed and that the VM on which the virtual container was running has not failed, virtualization management module 130 restarts the virtual container in the same VM. In some embodiments, virtualization management module 130 directs container daemon 124 in the VM to restart the virtual container and to assign a same container identifier as before the failure of the container. Responsive to determining that the virtual container has failed and that the VM on which the virtual container was running has also failed, virtualization management module 130 attempts to restart the VM itself.

At block 410, virtualization management module 130 determines whether the failed VM has been able to successfully restart within a threshold duration of time. In some embodiments, the failed VM is given a default period of time in which to complete the restart or reboot process and then report back to virtualization management module 130. If the threshold period of time has elapsed and the VM has restarted successfully, at block 412, virtualization management module 130 restarts all failed containers in the VM by transmitting a request to container daemon 124 on the VM. In some embodiments, virtualization management module 130 directs container daemon 124 to restart the containers using the same container identifiers and access information (e.g., IP addresses) used by the containers, and updates registry 134 accordingly.

At block 414, responsive to determining that the failed VM has not successfully restarted in the threshold period of time, virtualization management module 130 starts all failed containers in a different VM within pool 128 using the same access information as the failed VM, and using a shared virtual disk. For example, in the embodiment shown in FIG. 5B, VM1 has been unable to recover. As such, virtualization management module 130 selects a different VM within pool 500 for running the containers C1 and C2. Virtualization management module 130 may select one of the VMs that are already powered-on (VM2, VM3, VM4), or in some cases, may power on a VM (e.g., VM5 or VM6) using resource management techniques described earlier. In the example shown, virtualization management module 130 powers on VM5, and directs the container daemon on VM5 to start each of containers C1 and C2 using the same container identifiers (e.g., "cid=C1") and the same access information as the containers C1 and C2 had on VM1.

In one or more embodiments, virtualization management module 130 may designate (e.g., in response to user input) one or more containers in pool 128 as being "stateful" or "stateless." Stateful containers run applications that have a persistent state (e.g., databases), whereas stateless containers run application in which the state need not be persisted (e.g., web application front ends). Virtualization management module 130 may modify its restart behavior depending on whether the stopped container is a stateful container or a stateless container. In some embodiments, virtualization management module 130 may immediately restart a stateless container in a different VM within pool 128, as retaining the state at the time of failure is not critical. In other embodiments, in case of a failed stateful container, virtualization management module 130 may wait until high availability functionality has attempted to restart the failed VM, in order to preserve the state of the container at the time the VM and containers failed.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for virtual container management comprising:
   monitoring a status of a plurality of virtual containers executing on a pool of virtual machines (VMs);
   determining whether a virtual container of the virtual containers has failed based on the status of the virtual containers;
   responsive to determining that the virtual container has failed, determining whether a VM of the pool of VMs on which the virtual container was running has failed; and
   responsive to determining that the virtual container has failed and the VM on which the virtual container was running has not failed, restarting the virtual container in the VM with a same container identifier as before the failure of the virtual container.

2. The method of claim 1, wherein monitoring the status of the virtual containers executing on the pool of VMs comprises:
   querying a corresponding container daemon running in each VM of the pool of VMs to determine the status of the virtual containers.

3. The method of claim 1, wherein monitoring the status of the virtual containers executing on the pool of VMs comprises:
   iterating through a container information registry to check on each virtual container known to be executing on the pool of VMs.

4. The method of claim 1, wherein monitoring the status of the virtual containers executing on the pool of VMs comprises:
   utilizing a heartbeat mechanism with each container daemon running in the pool of VMs that periodically confirms the status of the virtual containers.

5. The method of claim 1, further comprising:
   responsive to determining that the virtual container has failed and the VM on which the virtual container was running has failed, restarting the VM; and
   determining whether the VM has been able to restart within a threshold duration of time.

6. The method of claim 5, further comprising:
   responsive to determining that the virtual container has failed and the VM on which the virtual container was running has failed and has restarted within the threshold duration of time, restarting the virtual container in the VM with the same container identifier as before the failure of the virtual container and access information used by the virtual container before the failure of the virtual container.

7. The method of claim 5, further comprising:
   responsive to determining that the virtual container has failed and the VM on which the virtual container was running has failed and has not restarted within the threshold duration of time, restarting the virtual container in a different VM from the pool of VMs with the same container identifier as before the failure of the virtual container and access information used by the virtual container on the VM before the failure of the virtual container.

8. The method of claim 1, further comprising:
   determining whether the virtual container is a stateful virtual container or a stateless virtual container, wherein the stateful virtual container executes a first application that has a persistent state and wherein the stateless virtual container executes a second application in which a state needs not be persisted.

9. The method of claim 8, further comprising:
   responsive to determining that the virtual container has failed, the VM on which the virtual container was running has failed and the virtual container of the virtual containers is the stateful virtual container, restarting the VM.

10. The method of claim 8, further comprising:
    responsive to determining that the virtual container has failed, the VM on which the virtual container was running has failed and the virtual container is the stateless virtual container, restarting the virtual container in a different VM from the pool of VMs.

11. A non-transitory computer-readable storage medium comprising instructions that, when executed in a computing device, performing virtual container management, by performing the steps of:

monitoring a status of a plurality of virtual containers executing on a pool of virtual machines (VMs);

determining whether a virtual container of the virtual containers has failed based on the status of the virtual containers;

responsive to determining that the virtual container has failed, determining whether a VM of the pool of VMs on which the virtual container was running has failed; and responsive to determining that the virtual container has failed and the VM on which the virtual container was running has not failed, restarting the virtual container in the VM with a same container identifier as before the failure of the virtual container.

12. The non-transitory computer-readable storage medium of claim 11, wherein monitoring the status of the virtual containers executing on the pool of VMs comprises:

querying a corresponding container daemon running in each VM of the pool of VMs to determine the status of the virtual containers.

13. The non-transitory computer-readable storage medium of claim 11, wherein monitoring the status of the virtual containers executing on the pool of VMs comprises:

iterating through a container information registry to check on each virtual container known to be executing on the pool of VMs.

14. The non-transitory computer-readable storage medium of claim 11, wherein monitoring the status of the virtual containers executing on the pool of VMs comprises:

utilizing a heartbeat mechanism with each container daemon running in the pool of VMs that periodically confirms the status of the virtual containers.

15. The non-transitory computer-readable storage medium of claim 11, wherein the steps further comprise:

responsive to determining that the virtual container has failed and the VM on which the virtual container was running has failed, restarting the VM; and determining whether the VM has been able to restart within a threshold duration of time.

16. A computer system for virtual container management, the computer system comprising:

a system memory;

a processor programmed to carry out the steps of:

monitoring a status of a plurality of virtual containers executing on a pool of virtual machines (VMs);

determining whether a virtual container of the virtual containers has failed based on the status of the virtual containers;

responsive to determining that the virtual container has failed, determining whether a VM of the pool of VMs on which the virtual container was running has failed; and responsive to determining that the virtual container has failed and the VM on which the virtual container was running has not failed, restarting the virtual container in the VM with a same container identifier as before the failure of the virtual container.

17. The computer system of claim 16, wherein monitoring the status of the virtual containers executing on the pool of VMs comprises:

querying a corresponding container daemon running in each VM of the pool of VMs to determine the status of the virtual containers.

18. The computer system of claim 16, wherein monitoring the status of the virtual containers executing on the pool of VMs comprises:

iterating through a container information registry to check on each virtual container known to be executing on the pool of VMs.

19. The computer system of claim 16, wherein monitoring the status of the virtual containers executing on the pool of VMs comprises:

utilizing a heartbeat mechanism with each container daemon running in the pool of VMs that periodically confirms the status of the virtual containers.

20. The computer system of claim 16, wherein the processor is further programmed to carry out the steps of:

responsive to determining that the virtual container has failed and the VM on which the virtual container was running has failed, restarting the VM; and determining whether the VM has been able to restart within a threshold duration of time.

* * * * *